Inventor
Claude Dornier
per Karl A. May
Attorney.

Patented June 7, 1938

2,119,806

UNITED STATES PATENT OFFICE 2,119,806

ROTOR FLYING MACHINE

Claude Dornier, Friedrichshafen-on-the-Bodensee, Germany

Original application January 10, 1934, Serial No. 706,090. Divided and this application November 11, 1935, Serial No. 49,300. In Germany January 16, 1933

10 Claims. (Cl. 244—17)

The present invention relates to a flying machine, more particularly to a flying machine having a pneumatically operated rotor, a blower for supplying the operating air for said rotor, a body, and an air conduit connected with said body for connecting said blower with the atmosphere.

This application is a divisional application of my application Ser. No. 706,090 filed Jan. 10, 1934.

An object of the present invention resides in the provision of a flying machine having a pneumatically operated rotor, a body, and an air conduit within said body for conducting the operating air for said rotor.

Another object of the present invention resides in the provision of a flying machine having a pneumatically operated rotor, a blower, a body, and an air conduit within said body for conducting the operating air for said blower and said rotor.

A further object of this invention resides in the provision of a flying machine having a pneumatically operated rotor, a blower, a body, and an air conduit within said body for conducting the operating air for said blower and said rotor, and having a motor for driving said blower and whereby air circulating through said conduit is used for cooling said motor.

Another object of this invention is to provide a flying machine having a pneumatically operated hollow rotor and guide means within said rotor for distributing and directing the operating air within said rotor.

Further and other objects of the present invention will be hereinafter set forth in the accompanying specification and claims and shown in the drawing which, by way of illustration, shows what I now consider to be a preferred embodiment of my invention.

Figure 1:
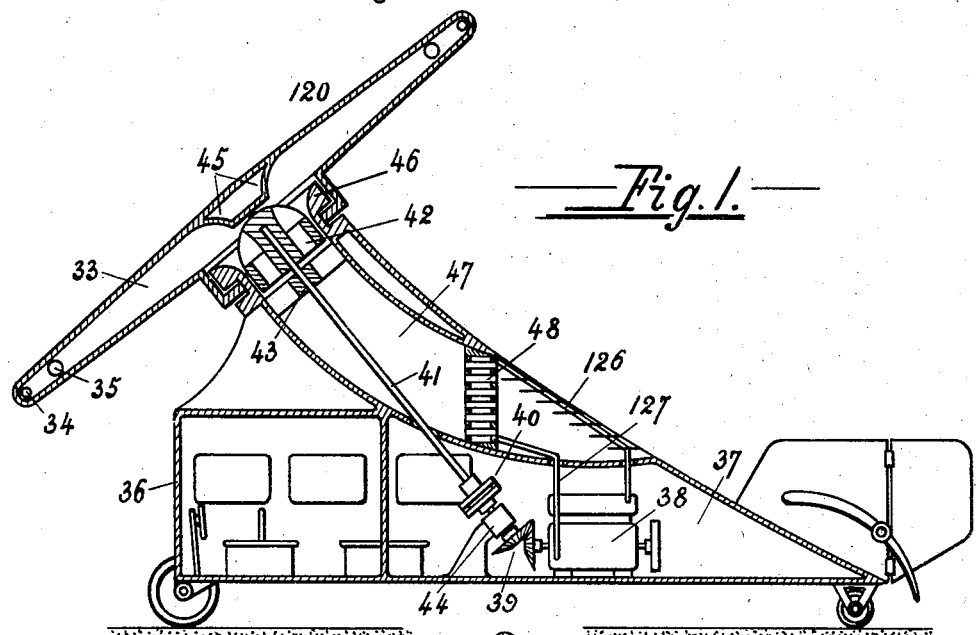
Fig. 1 is a part sectional view of a flying machine according to the present invention.

Referring more particularly to Fig. 1 of the drawing: 33 represents a hollow rotor having wings provided with apertures 34 and 35 through which air is either blown out of or taken into the interior of the rotor wings. A motor 38 having a cooling jacket is located in the lower rear part of body 37 which has a saddle-shaped concavely curved back and a compartment 36 extending forwards. By means of gear 39, coupling 40, and shaft 41, motor 38 is connected with and drives rotor 42 of a blower supplying operating air for the hollow rotor 33. Shaft 41 is carried by the bearings 43 and 44. With its ball-shaped end 120, blower 42 extends into the interior of rotor 33, which is equipped with a projecting part 45 of such configuration as to facilitate the air flow between the blower and the interior of the rotor.

Rotor 33 is carried by the fuselage by means of the axial and radial bearing 46. The air is taken in through channel 47 provided within body 37 and is forced by blower 42 into the hollow rotor 33 and leaves this rotor through the apertures 34 and/or 35 which are placed at the rear edge of the rotor wings. The air flow can also be reversed and the air taken in through openings located near the front edge of the rotor wings and discharged through channel 47. In both cases, the air passes through a cooler 48 which is connected with the cooling jacket of motor 38 by conduits 126 and 127 and acts as cooler for the cooling agent of the motor.

Figure 2:
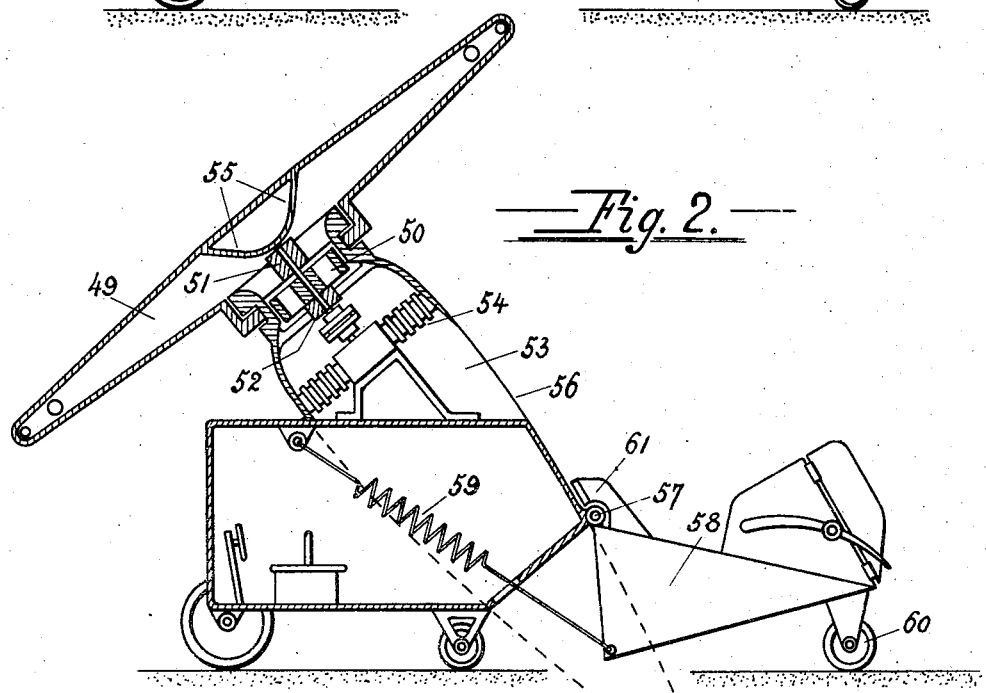
Fig. 2 is a part sectional view of a modified flying machine according to the present invention.

Fig. 2 illustrates an embodiment of my invention using the pneumatic reaction type rotor drive and an air cooled motor 54 driving the air blower 50 and located adjacent thereto. Blower 50 is rotatably carried by bearings 51 and 52. The air taken in or exhausted by the blower passes through channel 53 in which the motor is located, thereby directly cooling the motor. A guide 55 for the air is provided in the interior of rotor 49.

While I believe the above described embodiments of my invention to be preferred embodiments, I wish it to be understood that I do not desire to be limited to the exact details of design and construction shown and described, for obvious modifications will occur to a person skilled in the art.

What I claim is:

1. In a flying machine, a body with an air channel formed therethrough and opening with its rear end at the outer surface of said body and with its fore end at the front end of said body, a pneumatically operated, substantially hollow propeller rotatably connected with the front end of said body and, for air flow, with the fore end of said channel, blower means located within the fore end of said air channel and directly adjacent to said propeller and providing the interior of said propeller with a current of air, said channel assuring a streamlined flow of the air and reducing resistance to air flow adjacent to said blower means, whereby the operating efficiency of said blower means and of said propeller is increased.

2. In a flying machine, a body having an outer surface, a pneumatically operated propeller rotatably connected to the fore end of said body and having hollow wings producing lift and propelling power for said flying machine and constituting a unit located outside of and substantially separate from said body, a blower means air conductingly connected with the interior of said wings, an air channel formed through said body, said channel having a fore end which terminates in said propeller and contains said blower means, and having a rear end which opens remote from said propeller at the upper surface of said body.

3. In a flying machine, a body having an outer surface, a pneumatically operated propeller rotatably connected to the fore end of said body and having hollow wings producing lift and propelling power for said flying machine and constituting a unit located outside of and substantially separate from said body, a blower means air conductingly connected with the interior of said wings, an air channel formed through said body, said channel having a fore end which terminates in said propeller and contains said blower means, and having a rear end which opens remote from said propeller at the outer surface of said body, and a power motor connected with and driving said blower means and being also located in the fore end of said channel, and being cooled by air passing through said channel.

4. In a flying machine, a body having an outer surface, a pneumatically operated propeller rotatably connected to the fore end of said body and having hollow wings producing lift and propelling power for said flying machine and constituting a unit located outside of and substantially separate from said body, a blower means air conductingly connected with the interior of said wings, an air channel formed through said body, said channel having a fore end which terminates in said propeller and contains said blower means, and having a rear end which opens remote from said propeller at the outer surface of said body, and a power motor connected with and driving said blower means and being located in said body outside of said channel, a cooler located in said air channel and being cooled by air passing through said channel, and circulating conduits connecting said motor and said cooler for circulating a cooling agent through said motor and cooler.

5. In a flying machine, a body having an outer surface, a pneumatically operated propeller rotatably connected to the fore end of said body and having hollow wings producing lift and propelling power for said flying machine and constituting a unit located outside of and substantially separate from said body, a blower means air conductingly connected with the interior of said wings, an air channel formed through said body, said channel having a fore end which terminates in said propeller and contains said blower means, and having a rear end which opens remote from said propeller at the outer surface of said body, and a power motor connected with and driving said blower means and being located in said body outside of said channel, a cooler located adjacent to said rear end of said channel and being cooled by air passing through said channel, and circulating conduits connecting said motor and said cooler for circulating a cooling agent through said motor and cooler.

6. In a flying machine, a body having an outer surface, a pneumatically operated propeller rotatably connected to the fore end of said body and having hollow wings producing lift and propelling power for said flying machine and constituting a unit located outside of and substantially separate from said body, a blower means air conductingly connected with the interior of said wings, an air channel formed through said body, said channel having a fore end which terminates in said propeller and contains said blower means, and having a rear end which opens remote from said propeller at the outer surface of said body, and a power motor located in said body outside of said channel, and a shaft connecting said motor and said blower means, said shaft extending through said compartment and through said channel.

7. In a flying machine, a body with an air channel formed therethrough and opening with its rear end at the outer surface of said body and with its fore end at the front end of said body, a pneumatically operated, substantially hollow propeller rotatably connected with the front end of said body and, for air flow, with the fore end of said channel, blower means located within the fore end of said air channel and having a rotor which extends axially into the interior of said propeller, and providing the interior of said propeller with a current of air, said channel assuring a streamlined flow of the air and reducing resistance to air flow adjacent to said blower means, whereby the operating efficiency of said blower means and of said propeller is increased.

8. In a flying machine, a body with an air channel formed therethrough and opening with its rear end at the outer surface of said body and with its fore end at the front end of said body, a pneumatically operated, substantially hollow propeller rotatably connected with the front end of said body and, for air flow, with the fore end of said channel, blower means located within the fore end of said air channel and having a rotor with a hemispherical portion which extends axially into the interior of said propeller, and providing the interior of said propeller with a current of air, said channel assuring a streamlined flow of the air and reducing resistance to air flow adjacent to said blower means whereby the operating efficiency of said blower means and of said propeller is increased.

9. In a flying machine, a body with an air channel formed therethrough and opening with its rear end at the outer surface of said body and with its fore end at the front end of said body, a pneumatically operated, substantially hollow propeller rotatably connected with the front end of said body and, for air flow, with the fore end of said channel, blower means located within the fore end of said air channel and directly adjacent to said propeller and providing the interior of said propeller with a current of air, said propeller having internally projecting guide means adjacent to said blower means for directing and distributing the air current produced by said blower means.

10. In a flying machine, a body with an air channel formed therethrough and opening with its rear end at the outer surface of said body and with its fore end at the front end of said body, a pneumatically operated, substantially hollow propeller rotatably connected with the front end of said body and, for air flow, with the fore end of said channel, blower means located within the fore end of said air channel and having a rotor which extends axially into the interior of said propeller and providing the interior of said propeller with a current of air, said propeller having internally projecting guide means adjacent to said blower means for directing and distributing the air current produced by said blower means.

CLAUDE DORNIER.